US010272786B2

(12) United States Patent
Schneider

(10) Patent No.: US 10,272,786 B2
(45) Date of Patent: Apr. 30, 2019

(54) WHEELCHAIR SAFETY, POWER AND SHADE DEVICE AND METHOD

(71) Applicant: David Kurt Schneider, Kennewick, WA (US)

(72) Inventor: David Kurt Schneider, Kennewick, WA (US)

(*) Notice: Subject to any disclaimer, the term of this patent is extended or adjusted under 35 U.S.C. 154(b) by 0 days.

(21) Appl. No.: 13/736,828

(22) Filed: Jan. 8, 2013

(65) Prior Publication Data

US 2013/0186697 A1 Jul. 25, 2013

Related U.S. Application Data

(63) Continuation-in-part of application No. 13/350,015, filed on Jan. 13, 2012, now Pat. No. 8,448,728, and a continuation-in-part of application No. 12/417,159, filed on Apr. 2, 2009, now Pat. No. 8,215,421.

(60) Provisional application No. 61/584,708, filed on Jan. 9, 2012.

(51) Int. Cl.
*A61G 5/10* (2006.01)
*B60L 8/00* (2006.01)
*A61G 5/04* (2013.01)

(52) U.S. Cl.
CPC .............. *B60L 8/003* (2013.01); *A61G 5/10* (2013.01); *A61G 5/1094* (2016.11); *A61G 5/04* (2013.01); *B60L 2200/34* (2013.01); *Y02T 10/7083* (2013.01)

(58) Field of Classification Search
CPC ........................ A61G 2005/1094; A61G 5/10

USPC ......... 280/304.1; 180/2.2, 65.31; 297/184.15
See application file for complete search history.

(56) References Cited

U.S. PATENT DOCUMENTS

| | | | |
|---|---|---|---|
| 3,404,915 A * | 10/1968 | Souza | 297/17 |
| 4,279,044 A | 7/1981 | Douglas | |
| 4,389,057 A * | 6/1983 | Richard, Jr. | 280/304.1 |
| 4,966,145 A | 10/1990 | Kikumoto et al. | |
| 5,096,257 A * | 3/1992 | Clark | 297/184.15 |
| 5,168,889 A | 12/1992 | Diestle | |
| 5,203,363 A * | 4/1993 | Kidwell et al. | 135/90 |
| 5,205,308 A * | 4/1993 | Kendall et al. | 135/90 |
| 5,301,975 A * | 4/1994 | Rivera | 280/304.1 |
| 5,489,002 A * | 2/1996 | Streiff | 180/65.31 |
| 5,560,383 A * | 10/1996 | Fuller | 135/88.01 |
| 5,592,706 A | 1/1997 | Pearce | |
| 5,725,062 A * | 3/1998 | Fronek | 180/2.2 |

(Continued)

OTHER PUBLICATIONS

Boycott, R.; "Driven by the sun"; The Guardian; Guardian News and Media Limited; May 14, 2008; 5 pages.

(Continued)

*Primary Examiner* — Jeffrey J Restifo
(74) *Attorney, Agent, or Firm* — Rainier Patents, P.S.; Paul W. Mitchell

(57) ABSTRACT

The Safety, Power and Shade Device is a system usable with wheelchairs providing an upright and horizontal frame attachable by brackets to a wheelchair seat back. The frame allows for the installation of safety and illumination lights, a solar panel for supplemental recharging of an electric wheelchair battery and a means of shelter or shade. The frame assembly is constructed to allow the horizontal frame to fold over and behind the wheelchair for a vertical relationship with the frame upright.

7 Claims, 16 Drawing Sheets

(56) References Cited

U.S. PATENT DOCUMENTS

| | | | | |
|---|---|---|---|---|
| 5,891,065 A | * | 4/1999 | Cariapa | A61H 9/0078 601/149 |
| 5,921,258 A | * | 7/1999 | Francois | 135/88.03 |
| 6,010,173 A | * | 1/2000 | Chyan-Luen | B60Q 1/2611 296/78.1 |
| 6,014,784 A | | 1/2000 | Taylor et al. | |
| 6,102,479 A | * | 8/2000 | Wallace | 297/357 |
| 6,269,504 B1 | | 8/2001 | Romano et al. | |
| 6,313,394 B1 | * | 11/2001 | Shugar et al. | 136/244 |
| 6,586,668 B2 | * | 7/2003 | Shugar et al. | 136/244 |
| 6,782,936 B1 | * | 8/2004 | Girard et al. | 160/66 |
| 7,017,685 B2 | * | 3/2006 | Schoenberg | B60K 1/04 180/2.1 |
| 7,140,678 B1 | * | 11/2006 | Grant | 297/184.15 |
| 7,243,990 B1 | * | 7/2007 | Wahl | 297/184.15 |
| 7,316,450 B2 | * | 1/2008 | Ayers et al. | 297/184.15 |
| 7,374,238 B2 | * | 5/2008 | Lingwall | 297/184.11 |
| 7,490,684 B2 | * | 2/2009 | Seymour | B60K 16/00 180/65.1 |
| 7,585,020 B1 | * | 9/2009 | Wahl, Jr. | 297/184.15 |
| 7,815,254 B2 | * | 10/2010 | Reeb et al. | 297/184.15 |
| 8,215,421 B2 | * | 7/2012 | Schneider | 180/2.2 |
| 8,448,728 B2 | * | 5/2013 | Schneider | 180/2.2 |
| 8,640,796 B2 | * | 2/2014 | Wilson et al. | 180/2.2 |
| 9,056,037 B1 | | 6/2015 | Thomas | |
| 9,088,181 B2 | * | 7/2015 | Akin | H02J 7/35 |
| 9,649,235 B1 | * | 5/2017 | McComb-Jones | A61G 5/10 |
| 9,956,979 B1 | * | 5/2018 | Fernsten | B62B 9/005 |
| 2004/0237203 A1 | | 12/2004 | Romano et al. | |
| 2008/0084095 A1 | | 4/2008 | Wolas | |
| 2010/0193262 A1 | * | 8/2010 | Zhao | 180/2.2 |
| 2010/0225488 A1 | | 9/2010 | Hinterlong | |
| 2010/0253041 A1 | * | 10/2010 | Schneider | 280/304.1 |
| 2012/0112431 A1 | | 5/2012 | Schneider | |
| 2014/0110978 A1 | | 4/2014 | Schneider | |
| 2014/0115790 A1 | | 5/2014 | Romano et al. | |
| 2014/0159489 A1 | * | 6/2014 | Clough | 307/43 |

OTHER PUBLICATIONS

Quick, D.; "Across the UAE in eleven days in a solar-powered wheelchair"; Gizmag; Nov. 21, 2010; 7 pages.
Non-Final Office Action dated Oct. 4, 2011 from U.S. Appl. No. 12/417,159, 8 pages.
Response filed Jan. 3, 2012 to the Non-Final Office Action dated Oct. 4, 2011 from U.S. Appl. No. 12/417,159, 14 pages.
Notice of Allowance dated Mar. 20, 2012 from U.S. Appl. No. 12/417,159, 5 pages.
Non-Final Office Action dated Mar. 26, 2012 from U.S. Appl. No. 13/350,015, 8 pages.
Response filed Jul. 25, 2012 to the Non-Final Office Action dated Mar. 26, 2012 from U.S. Appl. No. 13/350,015, 8 pages.
Applicant-Initiated Interview Summary dated Aug. 3, 2012 from U.S. Appl. No. 13/350,015, 3 pages.
Notice of Allowance dated Oct. 29, 2012 from U.S. Appl. No. 13/350,015, 5 pages.
Notice of Allowance dated Feb. 13, 2013 from U.S. Appl. No. 13/350,015, 6 pages.
U.S. Appl. No. 61/584,708 titled "Solar Shade," filed Jan. 9, 2012 by inventor David Kurt Schneider, 45 pages.
Requirement for Restriction/Election dated Oct. 2, 2015 for U.S. Appl. No. 13/827,971, 5 pages.
Response filed Dec. 2, 2015 to the Requirement for Restriction/Election dated Oct. 2, 2015 for U.S. Appl. No. 13/827,971, 8 pages.
U.S. Appl. No. 13/718,152 titled "Patient Contact Compensating Wheelchairs," filed Oct. 24, 2012 by inventor David Kurt Schneider, 106 pages.
Non-Final Office Action dated Mar. 1, 2016 for U.S. Appl. No. 13/827,971, 16 pages.
Response filed Aug. 1, 2016 to the Non-Final Office Action dated Mar. 1, 2016 for U.S. Appl. No. 13/827,971, 11 pages.
Non-Final Office Action dated Oct. 26, 2016 from U.S. Appl. No. 13/827,971, 17 pages.
Final Office Action dated Jul. 11, 2017 from U.S. Appl. No. 13/827,971, 15 pages.
Response filed Mar. 27, 2017 to the Non-Final Office Action dated Oct. 26, 2016 from U.S. Appl. No. 13/827,971, 11 pages.
Applicant-Initiated Interview Summary dated Mar. 31, 2017 from U.S. Appl. No. 13/827,971, 2 pages.
Response filed Oct. 26, 2017 from U.S. Appl. No. 13/827,971, 10 pages.
Advisory Action dated Nov. 20, 2017 from U.S. Appl. No. 13/827,971, 3 pages.
Non-Final Office Action dated Dec. 27, 2017 from U.S. Appl. No. 13/827,971, 7 pages.
Response filed May 29, 2018 from U.S. Appl. No. 13/827,971, 9 pages.
Notice of Allowance dated Jul. 9, 2018 from U.S. Appl. No. 13/827,971, 7 pages.

* cited by examiner

WHEELCHAIR SAFETY, POWER AND SHADE DEVICE AND METHOD

CROSS-REFERENCE TO RELATED APPLICATIONS

This application is a utility application that claims priority from provisional application 61/584,708 filed 2012-1-9, which is incorporated by reference in its entirety. This application is also a continuation-in-part of, and claims priority from, U.S. Ser. No. 12/417,159, filed on 2009 Apr. 2, and U.S. Ser. No. 13/350,015, filed on 2012 Jan. 13, which are incorporated by reference in their entirety.

FIELD OF THE INVENTION

This invention relates to an apparatus for a wheelchair for safety, electrical power and shade.

BACKGROUND OF THE INVENTION

Wheelchair technology has been advanced through the use of light weight materials and electrical and other drive systems. Wheelchairs have become modes of transportation beyond the residential or retail environment. Wheelchairs are recognized as a principal means of transport for many including transit from residence to retail and also including off road use. Operation where other vehicular traffic may exist creates the need for enhanced safety, supplemental power and shade or shelter.

Shade or shelter apparatuses for wheelchairs and other applications are seen in U.S. Pat. No. 7,316,450 to Ayers, et al; U.S. Pat. No. 5,168,889 to Diestle; U.S. Pat. No. 5,301,975 to Rivera; U.S. Pat. No. 5,921,258 to Francois and U.S. Pat. No. 7,243,990 to Wahl.

The patents referred to herein are provided herewith in an Information Disclosure Statement in accordance with 37 CFR 1.97.

SUMMARY OF THE INVENTION

The Apparatus (1) provides a frame for use with a wheelchair. The frame, in the preferred embodiment, supports warning and illumination lights, a solar panel for supplemental charging of a wheelchair battery and shade and shelter. The frame is foldable for storage.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1:
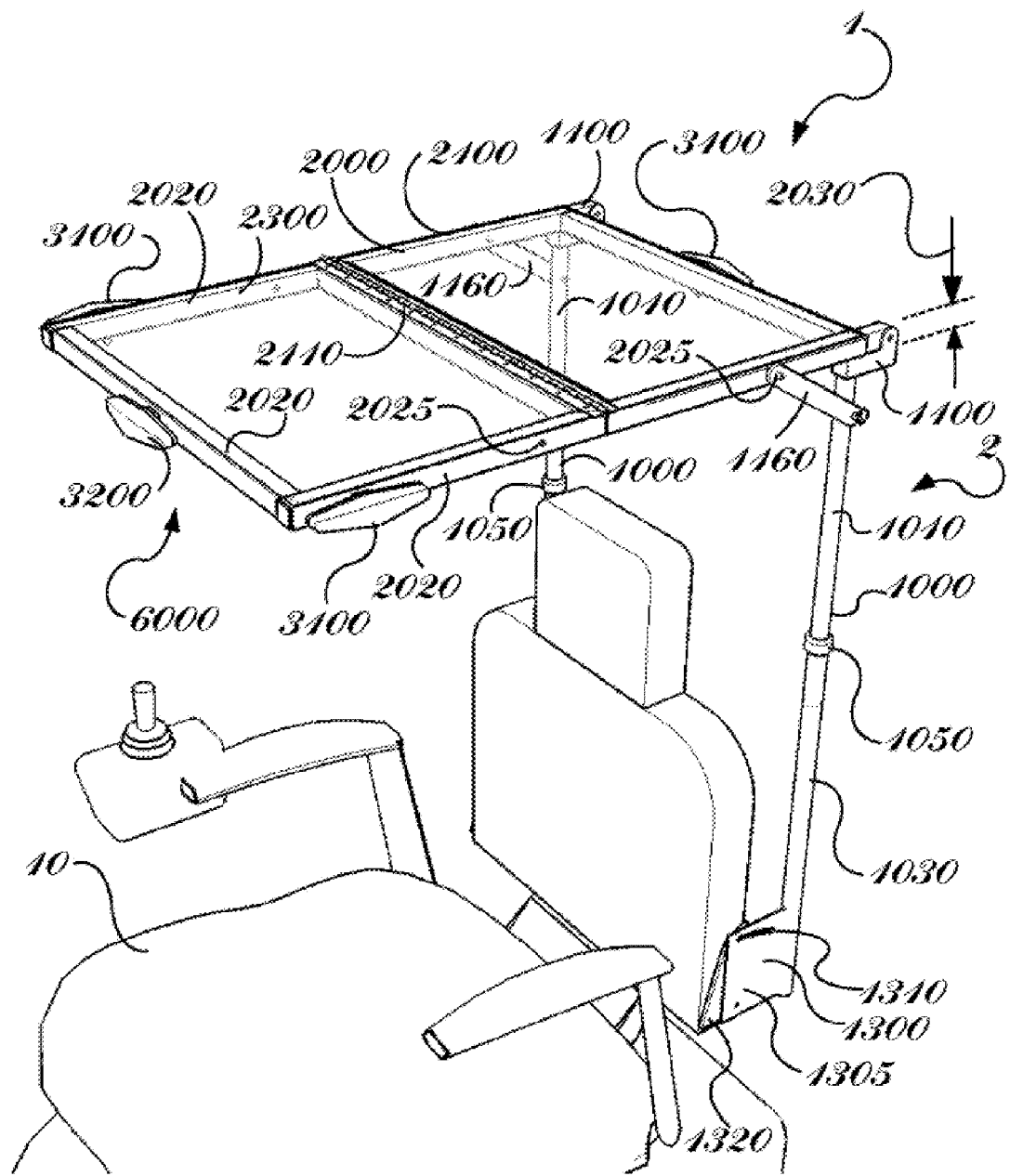
FIGS. 1 and 6 illustrate the safety, power and shade device (1) showing the frame (2) having frame upright (1000) comprising frame upright top members (1010), frame upright top member brace aperture (1025) (FIG. 2), frame upright bottom members (1030), and frame height adjustment (1050) comprised of means to fasten a rotating component to a shaft including but not limited to split-rings, slotted inner and outer sleeves, ferrules and detents with aligned apertures. Seen is the frame upright/horizontal hinge (1100), the at least one frame upright/horizontal brace (1160), the frame wheelchair bracket (1300) and the frame wheelchair seat bracket (1320). Also seen is the frame horizontal (2000) with frame horizontal members (2020) and frame horizontal member apertures (2025). Illustrated is the frame horizontal member width or diameter (2030), the frame horizontal first unit (2100), frame horizontal hinge (2110) and frame horizontal second unit (2300). Also seen is the frame safety system (3000) (FIG. 5) with frame safety system caution lights (3100) and frame safety system vision lights (3200).
Figure 5:
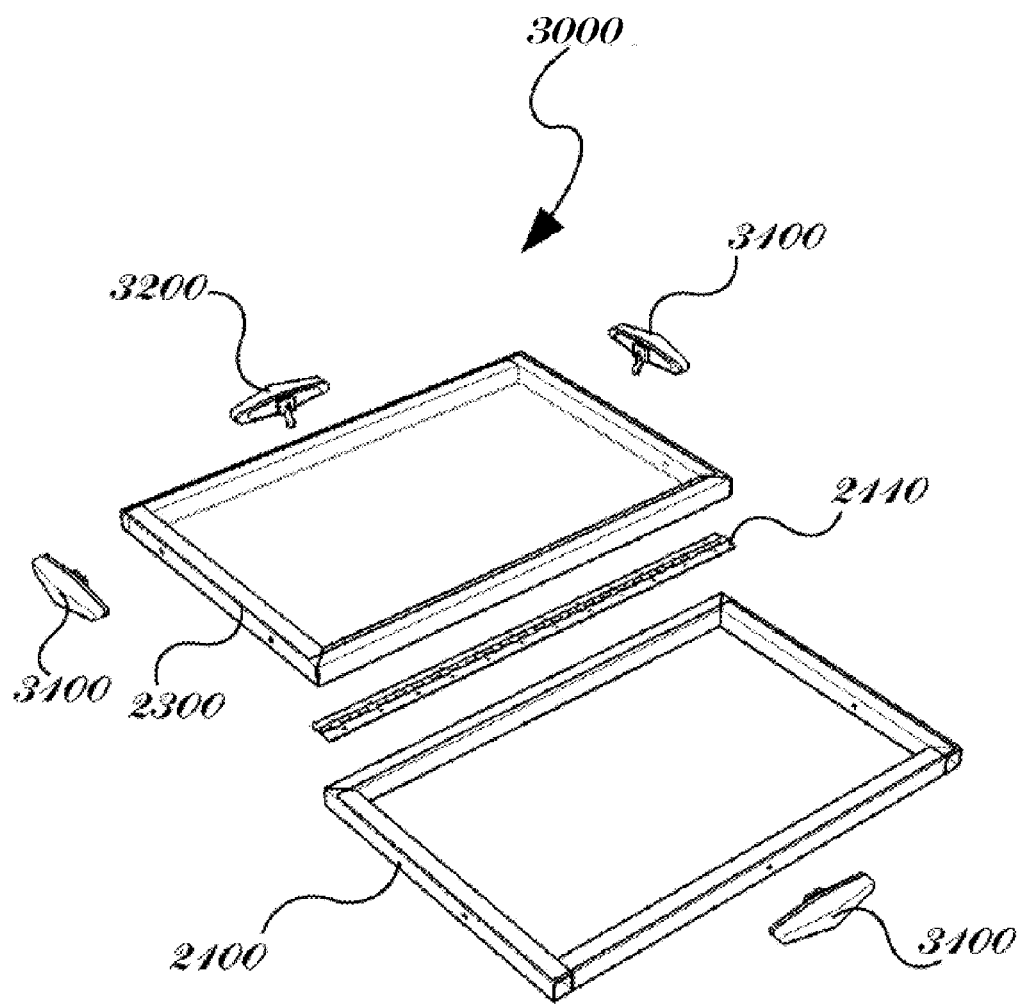
FIG. 5 is an exploded view of the frame horizontal (2000).
Figure 6:
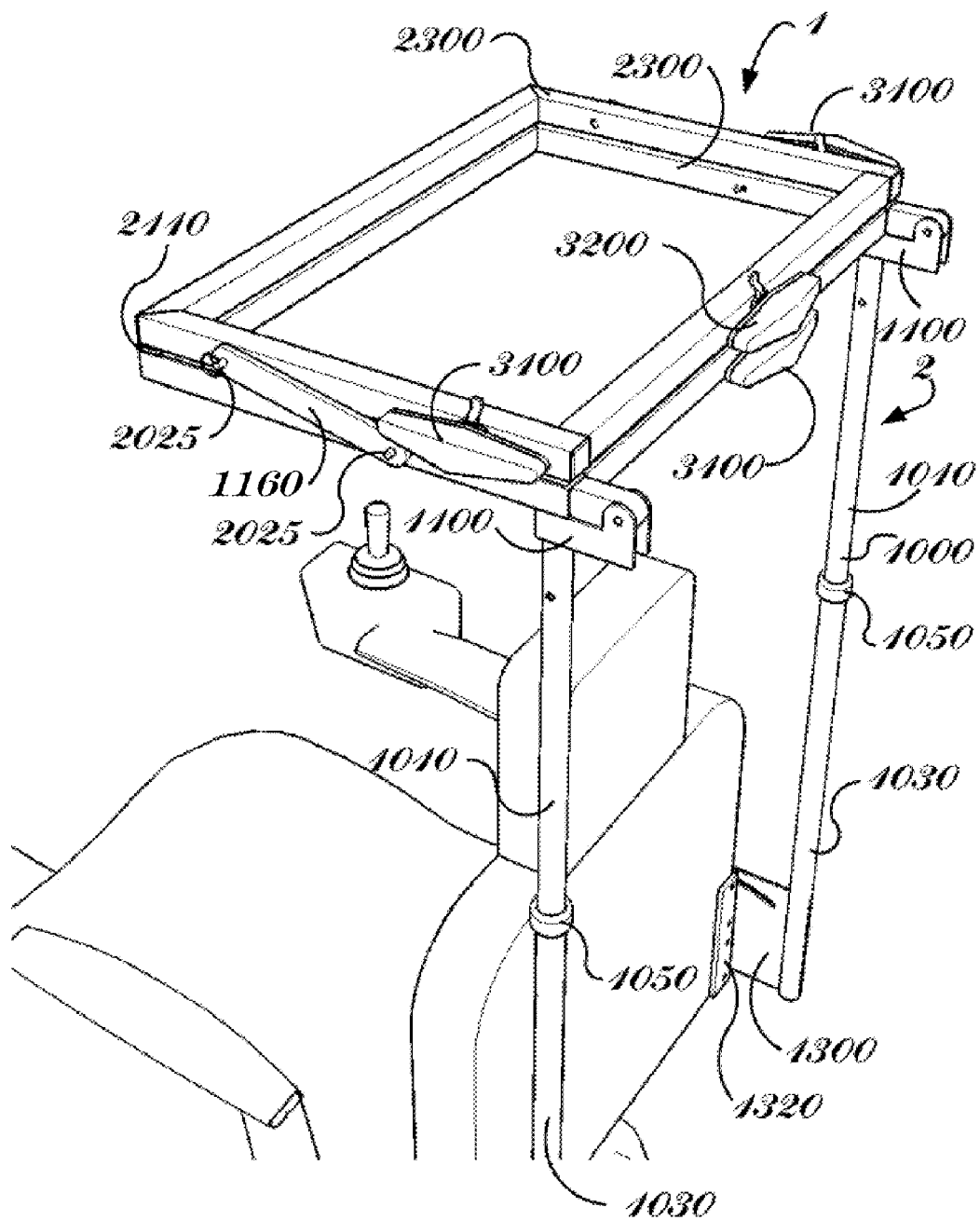

FIGS. 1, 5 and 6 illustrate the Safety, Power and Shade Device (1) showing a tubular frame (2) having at least two upstanding frame uprights (1000) and a generally horizontal frame horizontal (2000) pivotally interconnected with a frame upright/horizontal hinge (1100). It is recognized that the frame horizontal (2000) will pivot, for frame storage, about the frame upright/horizontal hinge (1100) to be folded over the frame uprights (1000) and downwardly to a generally vertical downwardly directed position generally parallel with the upstanding frame upright (1000).

Also illustrated is that each of the at least two frame uprights (1000) has a tubular frame upright top member (1010) and a tubular frame upright bottom member (1030). The frame upright top member (1010) is slidably received by the frame upright bottom member (1030) and retained at a specific height by a frame height adjustment (1050) comprised of a common method of fastening a rotating component to a shaft including, split-rings, slotted inner and outer sleeves, ferrules and/or detents with aligned apertures in each of the frame upright top members (1010) and the frame upright bottom members (1030).

Also seen in FIGS. 1, 2, 5 and 6 is the frame upright/horizontal hinge (1100) comprised of a frame upright/horizontal hinge male member (1110), having a frame upright/horizontal hinge male member pivot aperture (1114), and a frame upright/horizontal hinge female member (1130). Also seen is a frame upright/horizontal hinge female member pivot aperture (1134). The frame upright/horizontal hinge male member pivot aperture (1114) is aligned with the frame upright/horizontal hinge female member pivot aperture (1134) and the two are pivotally interconnected.

Figure 2:
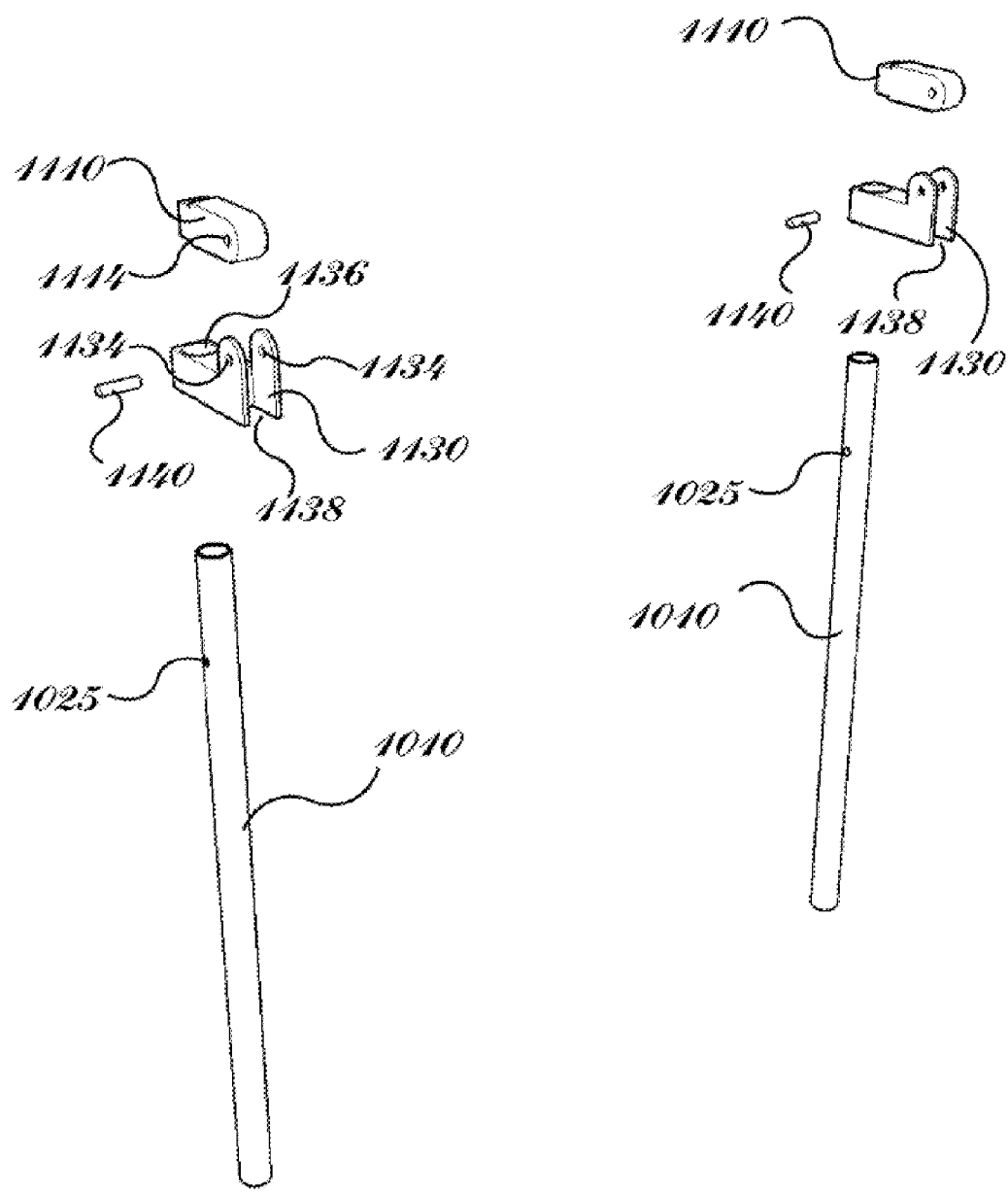
FIGS. 2, 3 and 4 illustrate the frame (2) with frame upright (1000) showing the frame upright top member (1010), frame upright top member brace aperture (1025), frame upright bottom member (1030), and frame height adjustment (1050). Also seen is the frame upright/horizontal hinge (1100), the frame upright/horizontal hinge male member (1110), the frame upright/horizontal hinge male member pivot aperture (1114), the frame upright/horizontal hinge female member (1130), the frame upright/horizontal hinge female member pivot aperture (1134), the frame upright/horizontal hinge female member upright connection (1136), the frame upright/horizontal hinge slot (1138) and the frame upright/horizontal hinge pivot shaft (1140). Also illustrated is the frame wheelchair bracket (1300) showing the frame wheelchair bracket aperture (1305), the frame wheelchair bracket slot (1310), the frame wheelchair seat bracket (1320) and the frame wheelchair seat bracket apertures (1340).
Figure 3:
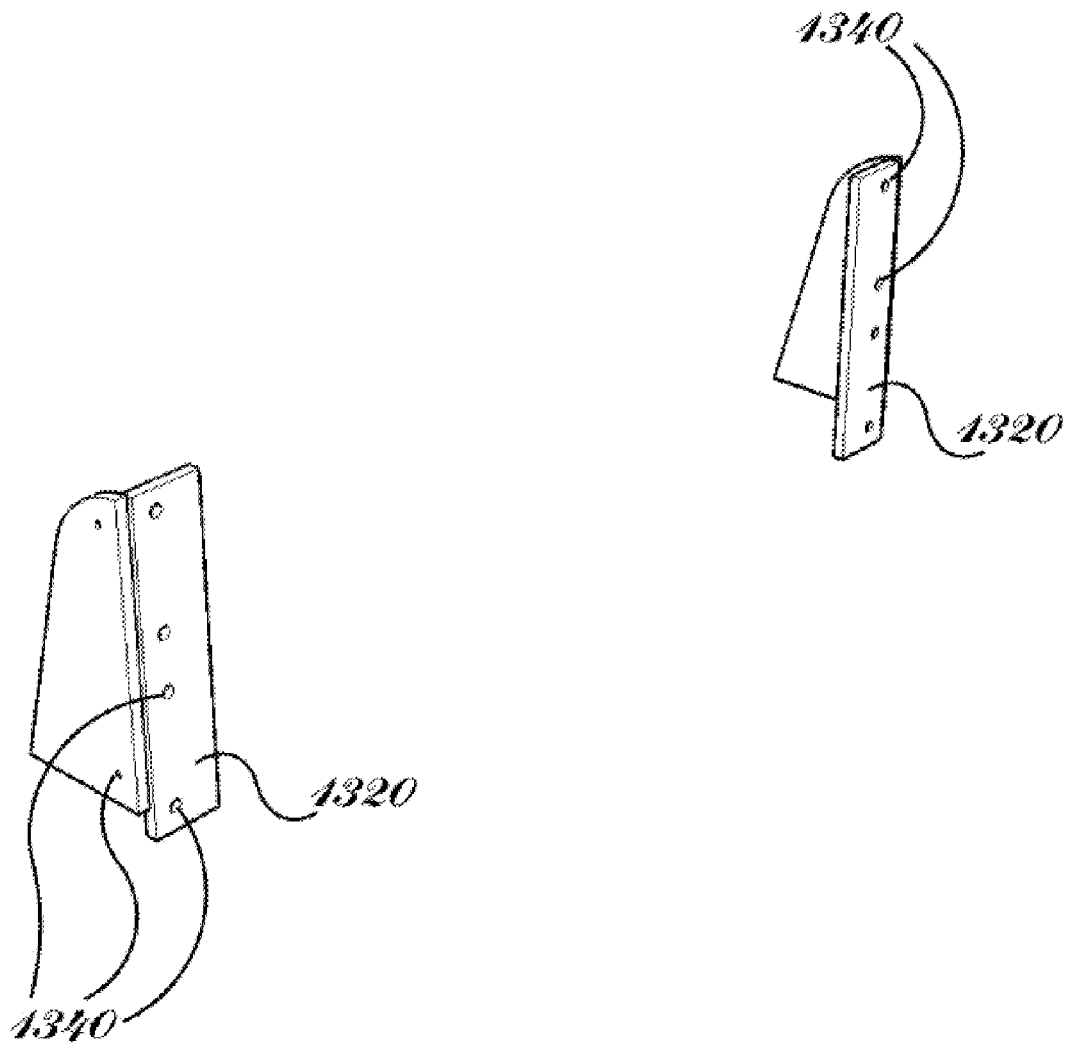

As seen in FIG. 2, the frame upright/horizontal hinge female member (1130) is generally orthogonal to the frame upright (1000) and has a frame upright/horizontal hinge female member upright connection (1136) comprising a tube sized to receive and be immovably affixed, generally by welding, to the frame upright (1000) at the point of interconnection with the frame horizontal (2000). The frame upright/horizontal hinge female member (1130) is outwardly extending from the frame upright (1000). The frame upright/horizontal hinge female member pivot aperture (1134) is distal to the frame upright (1000) by a distance of at least ½ of the frame horizontal member width or diameter (2030). The frame upright/horizontal hinge female member pivot aperture (1134) extends upwardly from the frame upright/horizontal hinge female member (1130) by a distance of at least ½ of the frame horizontal member width or diameter (2030). A frame upright/horizontal hinge slot (1138) extends upwardly and downwardly and generally parallel with the frame upright (1000). The elongated frame upright/horizontal hinge male member (1110) is rigidly and immovably affixed, generally by welding, to and in alignment with the frame horizontal member (2020).

As shown in FIGS. 1, 5, 6 and 7, the frame horizontal (2000) is generally rectangular and is comprised of rigid tubular frame horizontal members (2020), having a frame horizontal member width or diameter (2030) comprising the width or diameter of the tube.

Figure 7:
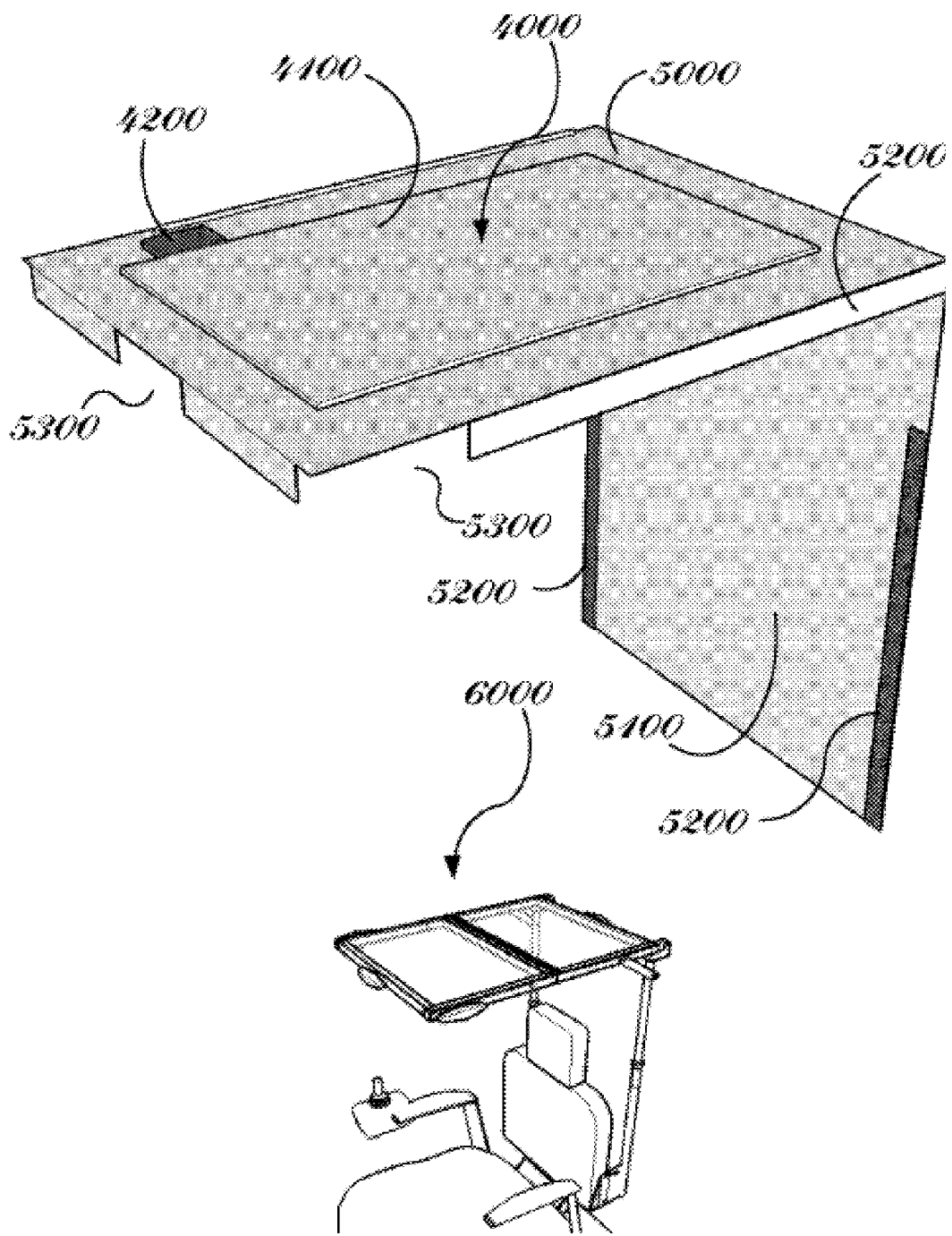
FIG. 7 illustrates the frame power system (4000) showing the frame power system solar panel (4100) and the frame power system electrical connections (4200). Also shown is the frame shade system (5000) with frame shade panel (5100) and frame shade panel connectors (5200).
Figure 8:
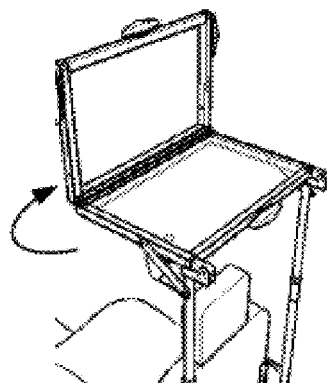
FIGS. 8 through 13 illustrate the method of deployment and storage of the safety, power and shade device (1).
Figure 9:
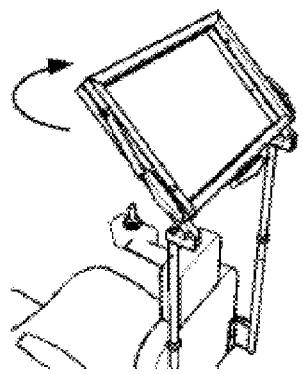
Figure 10:
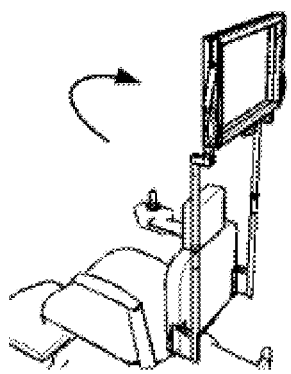
Figure 11:
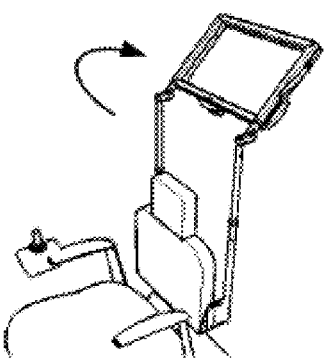
Figure 12:
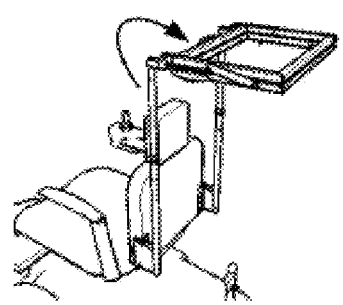
Figure 13:
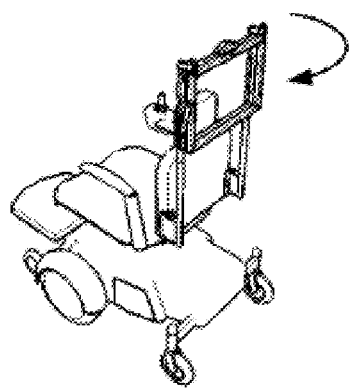

Rigidity to the deployed (6000) frame is further provided, as seen in FIGS. 1, 6 and 7, by at least one frame upright top member brace aperture (1025) and at least one frame horizontal member brace aperture (2025) which receive at least one elongated rigid frame upright/horizontal brace (1160). The frame upright/horizontal brace (1160) is removably connected by bolts, pins or detents to the frame upright (1000) at the at least one frame upright top member brace aperture (1025) and to the frame horizontal (2000) at the at least one frame horizontal member brace aperture (2025).

Figure 4:
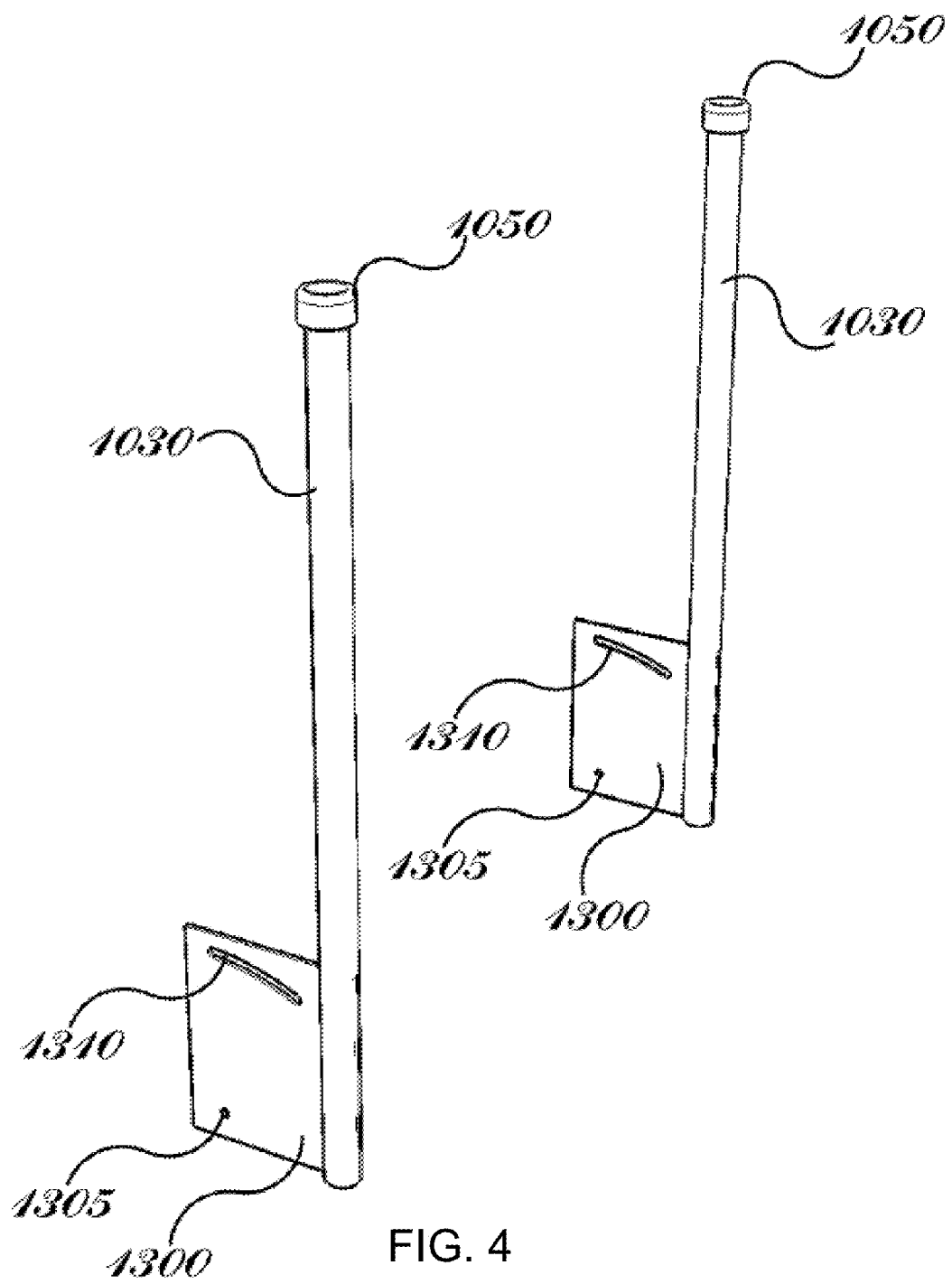

FIGS. 1, 3, 4 and 6 illustrate a frame wheelchair seat bracket (1320), having frame wheelchair seat bracket apertures (1340), which are rigidly affixed, generally by screws, to the lower side of each side of the upright portion of a wheelchair seat 10. Shown in FIG. 4 is at least one rigid planar frame wheelchair bracket (1300) which is rigidly and immovably affixed, generally by welding, to each of the frame upright bottom members (1030) distal to the frame upright top member (1010). The frame wheelchair bracket (1300) extends outwardly and forwardly from the frame upright bottom member (1030) and is generally in alignment with the frame horizontal (2000). A frame wheelchair bracket aperture (1305), in a frame wheelchair bracket (1300) is distal to the frame upright bottom member (1030), is aligned with and pivotally and rotatably connected at least one frame wheelchair seat bracket aperture (1340) to the frame wheelchair seat bracket (1320). A frame wheelchair bracket slot (1310) is formed in the frame wheelchair bracket (1300) and is aligned with and is slidably and adjustably connected at least one frame wheelchair seat bracket aperture (1340), for angular adjustment of the frame upright (1000) to correspond to the angular position of a wheelchair seat back. Pivotally, rotatable, slidable and adjustable connections are provided, for example, by wing nut and bolt or allen nut and bolt and are immovably secured when angular adjustment is completed.

As seen in FIGS. 1, 5 and 6, it is seen that the frame horizontal (2000) consists of at least two frame horizontal members (2020) including a generally rectangular frame horizontal first unit (2100), proximal to the frame upright (1000), and a generally rectangular frame horizontal second unit (2300) which is rotatably and foldably interconnected to the frame horizontal first unit (2100) by a frame horizontal hinge (2110). There is at least one frame horizontal member brace aperture (2025) in the frame horizontal first unit (2100) and in the frame horizontal second unit (2300). The frame horizontal hinge (2110) is, in the preferred embodiment, generally provided by a piano hinge attached to both the frame horizontal first unit (2100) and the frame horizontal second unit (2300) to restrict downward movement of the frame horizontal second unit (2300) when unfolded and to allow the frame horizontal second unit (2300) to rotate and fold upwardly and on top of the frame horizontal first unit (2100) in preparation for storage. When the frame horizontal second unit (2300) is rotated and folded upwardly and on top of the frame horizontal first unit (2100), the frame upright/horizontal brace (1160) is disconnected from the at least one frame upright to member brace aperture (1025) and is removably connected by bolts, pins or detents at the at least one frame horizontal member brace aperture (2025) in the frame horizontal first unit (2100) and at the at least one frame horizontal member brace aperture (2025) in the frame horizontal second unit (2300).

In the preferred embodiment the Device includes a frame safety system (3000), a frame power system (4000) and a frame shade system (5000). The frame safety system (3000) comprises at least one frame safety system caution light (3100), generally comprised of a flashing red or amber light, and at least one frame safety system vision light (3200), generally comprised of a white light illuminating the path ahead, immovably affixed to either or both of the frame horizontal (2000) and the frame upright (1000). The frame power system (4000) comprises at least one frame power system solar panel (4100), generally comprised of a solar panel, and frame power system electrical connections and circuits (4200) generally electrically interconnected with a wheelchair electrical system providing recharging power to the wheelchair battery. The frame shade system (5000) consists of at least one frame shade panel (5100) generally comprised of a transparent, translucent or opaque plastic or cloth fabric. Connections to secure the frame shade panel to and around the frame upright (1000) and frame horizontal (2000) include at least one frame shade panel connector (5200) generally comprised of hook and loop interconnections, and at least one shade panel light or wiring aperture (5300) generally composed of apertures sized to receive frame safety system caution lights (3100) and or frame safety system vision lights (3200).

It will be appreciated that the Device can also be presented with each of the frame safety system (3000), the frame power system (4000) and frame shade system (5000) either individually or in several combinations.

A method of deploying and storing the safety, power and shade device (1) is also disclosed. From a position of frame deployment (6000), rotating upwardly the frame horizontal second unit (2300), rotating and folding the frame horizontal second unit (2300) on top of the frame horizontal first unit (2100). Disconnecting the frame upright/horizontal brace (1160) from the frame upright top member brace aperture (1025) and connecting the frame upright top member brace aperture (1025) at the frame horizontal member aperture (2025) in the frame horizontal second unit (2300). Rotating the frame horizontal second unit (2300) and frame horizontal first unit (2100) backwardly and down to a vertical position generally parallel with the frame upright (1000). Loosening the frame height adjustment (1050) and lowering the frame upright top member (1010) into the frame upright bottom member (1030). And finally, reversing the sequence of steps for redeployment (6000).

Figure 14:
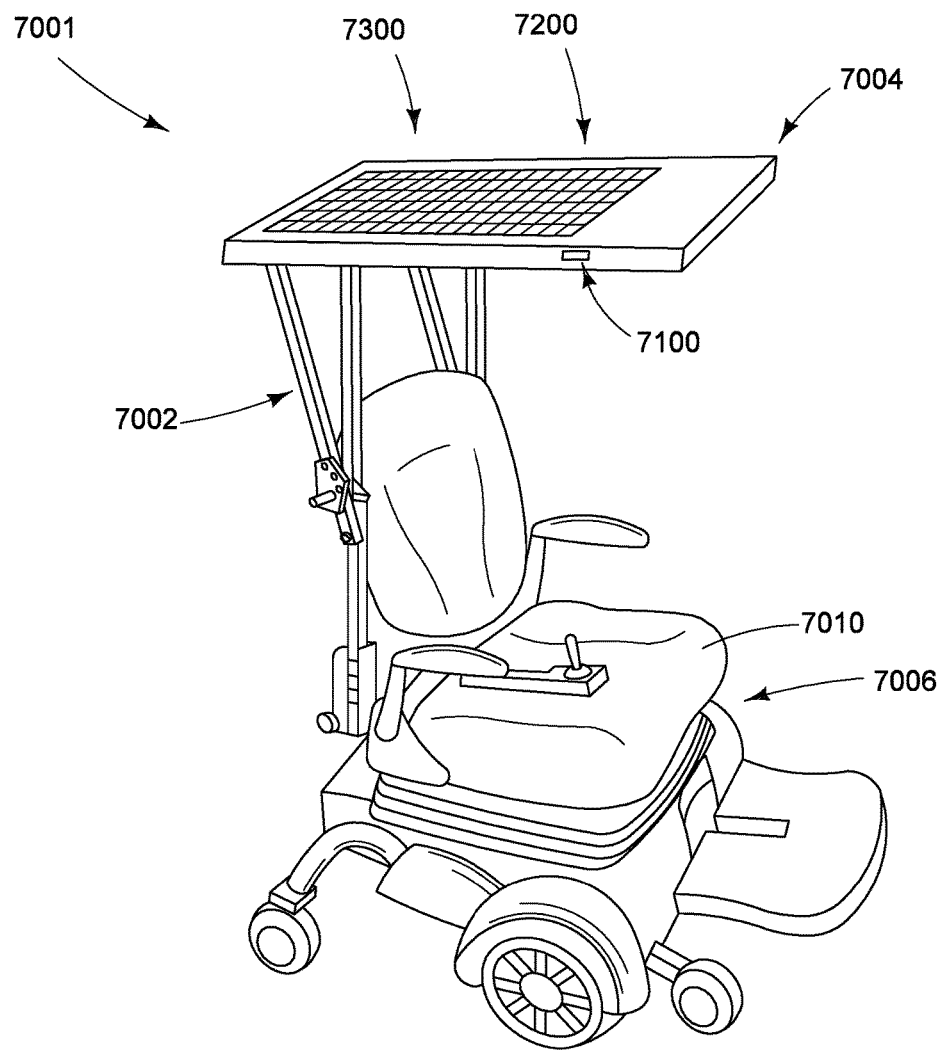
FIG. 14 shows a perspective view of a safety, power and shade device mounted on a wheelchair in accordance with some implementations of the present concepts.

FIGS. 14 through 24D collectively illustrate other implementations of a safety, power and shade device (7001) which is similar to the safety, power and shade device (1) (e.g., "apparatus") described above relative to FIGS. 1 through 13. As shown in FIG. 14, the safety, power and shade device (7001) can include a frame (7002) and a solar protector (7004). The frame (7002) can be connected to a wheelchair (7006), such as to a wheelchair seat (7010) and/or other structure of the wheelchair. The frame can support the solar protector (7004). In some implementations, the solar protector can include a frame safety system (7100), a frame power system (7200), and/or a frame shade system (7300).

Figure 15:
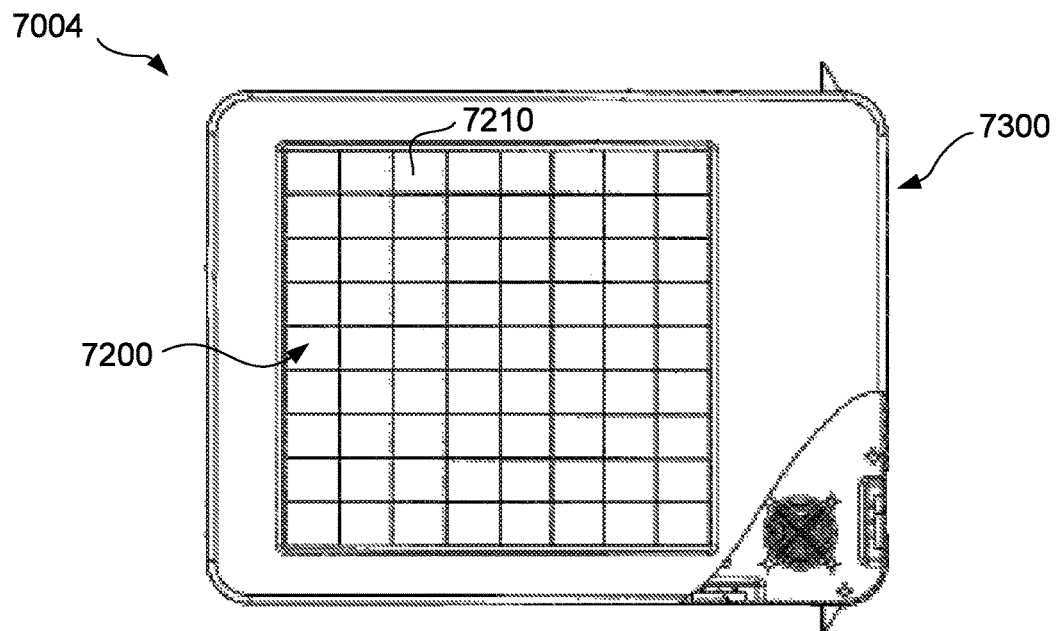
FIGS. 15 and 16 show topside and underside drawings of a solar protector in accordance with some implementations of the present concepts.
Figure 16:
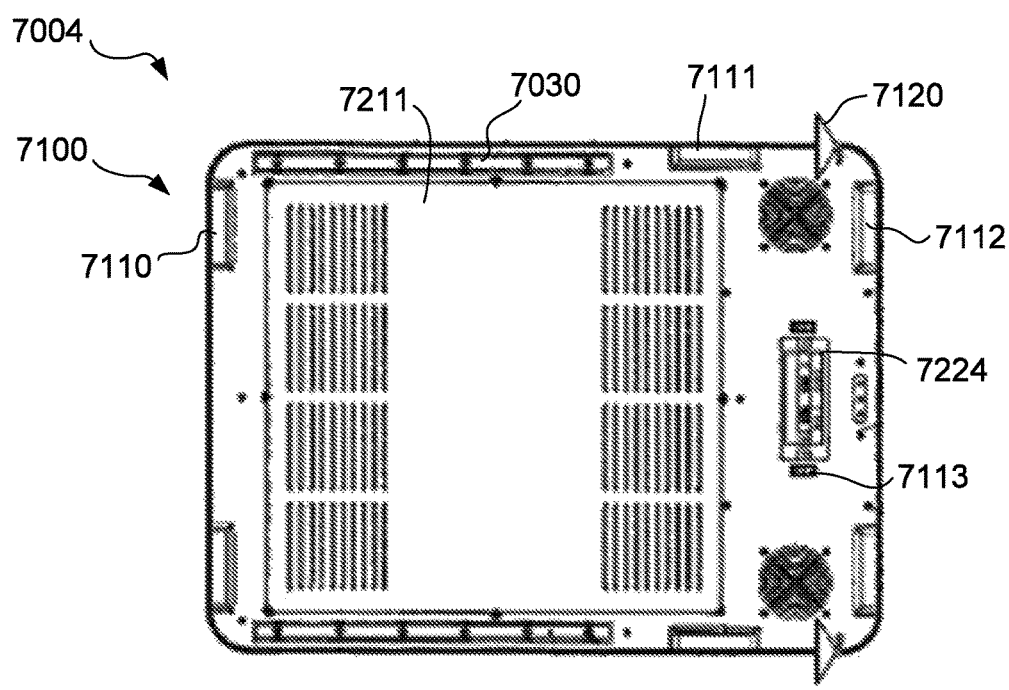
Figure 17:
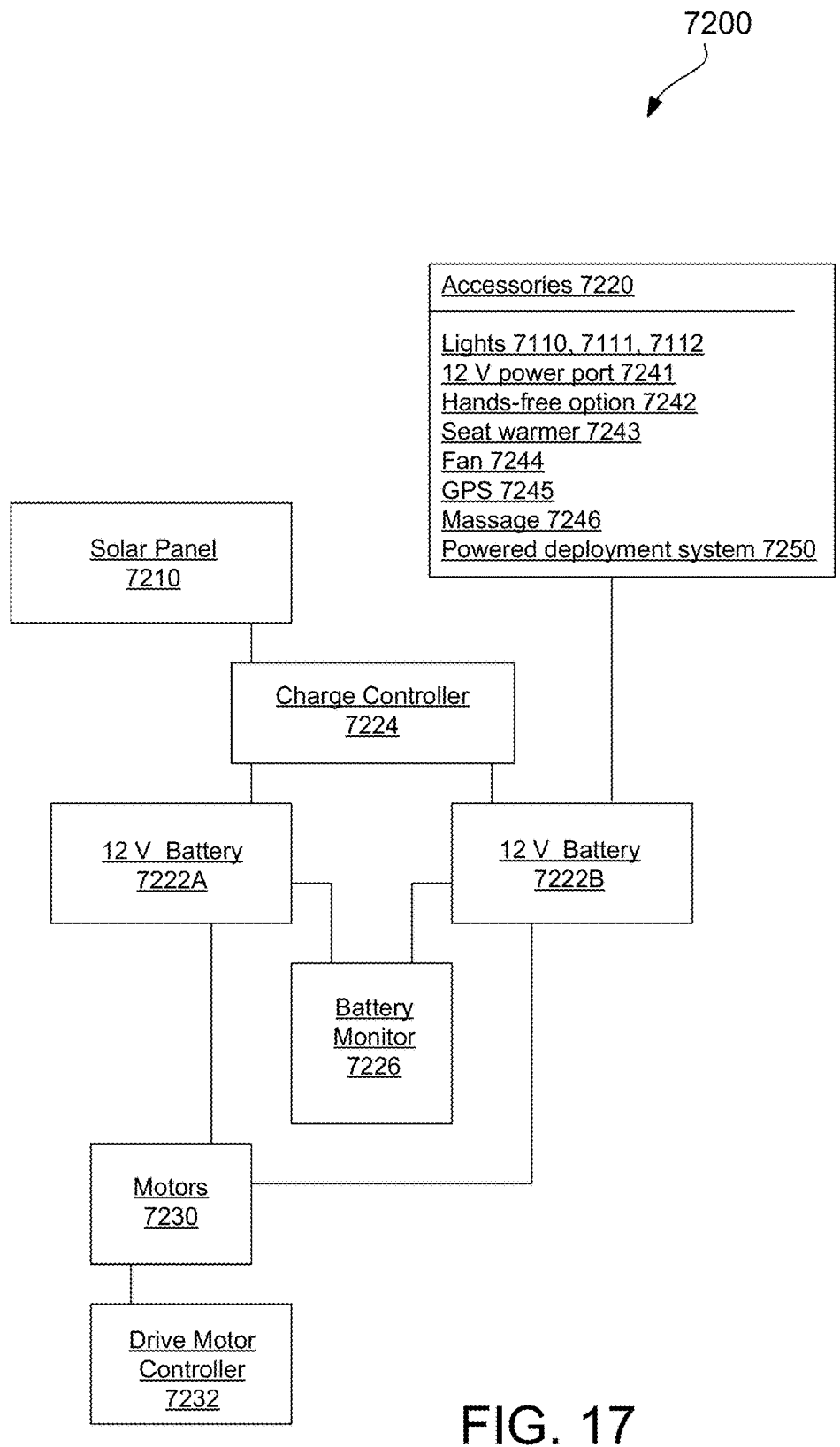
FIG. 17 is a diagram of a frame power system for a safety, power and shade device in accordance with some implementations of the present concepts.

FIGS. 15 through 17 collectively illustrate features of the solar protector (7004) in accordance with some implementations. FIG. 15 illustrates a topside of the solar protector (7004) (e.g., toward the sky when deployed), while FIG. 16 illustrates the underside of the solar protector (e.g., toward the user and the ground when deployed). In some implementations, the solar protector (7004) can include the frame shade system (7300). The solar protector can include the frame power system (7200). The frame power system (7200) can include one or more solar panels (7210). The solar protector can include a vented solar panel cover (7211) and a mounting bracket (7030) for mounting the solar protector (7004) to the frame (7002) (see FIG. 14).

Additionally, FIG. 16 shows elements of the frame safety system (7100). The frame safety system can include color-coded LED lights (or other lights), such as Piranha LED light bars. The color-coded LED lights can be immovably affixed to the sides of the solar protector (7004). Alternatively, the color-coded LED lights can be moveable and/or detachable. The color-coded LED lights can include one or more frame safety system rear caution lights (7110). In one case, the frame safety system rear caution lights (7110) can include a red LED light bar, directed generally horizontally facing in the rear direction. The color-coded LED lights can also include one or more frame safety system side caution lights (7111). In one case, the frame safety system side caution lights can be manifest as an amber LED light bar, directed generally horizontally facing outward on either side of the wheelchair. The color-coded LED lights can also include one or more frame safety system vision lights (7112). In one case, the frame safety system vision lights can be manifest as a white LED light bar illuminating the path ahead. In other instances one or more of the frame safety system lights may be affixed or otherwise attached to a part of the frame or to the wheelchair.

The frame safety system (7100) can also include one or more rearview mirrors (7120). In the illustrated case, the rearview mirrors are mounted on the underside of the solar protector (7004) and positioned so that the person sitting in the wheelchair seat (7010) (see FIG. 14) has a view of the area behind the wheelchair. Having a view of the area behind the seated person can be advantageous for safety purposes especially for persons with limited mobility, who may not be able to easily turn and look behind them. The rearview mirror may be mounted on the left or right side of the person in the wheelchair, or on both sides. The mirror or mirrors may be contained underneath the solar protector or extend outward from underneath the solar protector a reasonable distance. The mirror can be adjustable by the user and can also be configured to fold out of the way for storage of the solar protector (7004).

FIG. 17 shows a schematic of the frame power system (7200). The frame power system can include elements and circuits that are configured to be electrically interconnected with a wheelchair electrical system providing recharging power to the wheelchair battery(s).

In the illustrated configuration, the frame power system (7200) can include one or more solar panels (7210) and one or more electrical accessories (7220). The frame power system and/or the wheelchair can also include one or more batteries (7222A, 7222B) a battery charge controller (7224), a battery monitor (7226), one or more drive motors (7230), and one or more drive motor controllers (7232). Various types and/or numbers of batteries can be employed. For purposes of explanation, a pair of 12 volt batteries can be employed with 24 volt drive motors. The drive motors (7230) can be selectively coupled across the batteries in serial by the drive motor controller. Other components, such as the accessories (7220) can be connected to the batteries individually or in parallel to obtain 12 volt power.

The battery charge controller (7224), such as a Fox 220 20A 12/24V 1 Battery Bank Charge Controller, can utilize power supplied by the solar panels (7210) to maintain proper charging voltage on the batteries (7222A, 7222B) and prevent overcharging. The battery monitor (7226) can display system data such as battery charge state or status, system power, and fault diagnosis. In one implementation the battery monitor (7226) is manifest as a Fox Remote Display Unit MD1. As shown in FIG. 16, the battery monitor (7226) (or a display thereof) can be mounted on the underside of the solar protector (7004) where it may be accessed (or viewed) by the person sitting in the wheelchair. In other instances, the battery monitor may be mounted in another place that is accessible by the person in the wheelchair, considering their limited mobility, such as on the wheelchair armrest.

Referring again to FIG. 17, the battery or batteries (7222A, 7222B) can be electrically connected to drive motors (7230) by the drive motor controller (7232) to drive and/or steer the wheelchair. The frame power system (7200) can run accessories (7220) off of either of the batteries (7222A, 7222B). In this case, the accessories (7220) can include the LED lights (e.g., 7110, 7111, and 7112) for the frame safety system (7100) (see FIG. 16). The frame safety system lights (e.g., safety lights) can be integrated with the frame power system with an LED driver, and also have an on/off switch (7113), such as an illuminated rocker switch which may be single pole, single throw or double pole, double throw. FIG. 16 shows the on/off switch (7113) mounted on the underside of the solar protector (7004), although in other instances it may be mounted in another place that is accessible by the person in the wheelchair, such as on the wheelchair armrest.

Referring again to FIG. 17, in this case, the accessories (7220) also include a 12 volt DC or other type of power port (7241) for charging electronic devices, such as a mobile phone. The power port may be mounted in any location on the wheelchair to facilitate accessibility for the person in the wheelchair, given their limited mobility, or to accommodate placement of the electronic device, such as where a mobile phone might be stored. The power port might also be incorporated with a mount that holds the mobile phone for the person. Another accessory that can be included is a BlueTooth™ type hands-free option for a mobile phone. In the case of a person with limited upper body mobility, controls for the hands-free option may be placed conveniently on the armrest so that they may initiate or receive calls easily.

Other accessories (7220) that may be included are a global positioning system (GPS) location device (7245), a wheelchair seat warmer (7243), a fan (7244), and a massage feature (7246). The fan may be either for the comfort of the person in the wheelchair or to cool any part of the frame power system (7200). The fan may be located under the seat of the wheelchair and positioned to increase airflow under the seat in coordination with ported holes in the seat bottom cushion for the comfort of the occupant. An example of a massage feature is a single speed or variable-speed vibration massage device located in the lumbar spine cushion of the wheelchair seat (and/or other location), aiding with blood flow and muscle relief. Once activated manually the massage feature could stay on for as long as the seat occupant needs, be on a timer, and/or be tied to battery charge state. Massage is advantageous to eliminate cramping of muscles and aid in blood flow throughout the body, while also helping relieve tension and stress.

Another accessory (7220) that can be included is an automatic, powered deployment system (7250) for moving the safety, power and shade device (7001) from the deployed position to the frame storage position and vice versa, allowing the person in the wheelchair to stay seated (shown in FIG. 20 and further discussed below). This can be advantageous to a person with limited mobility or physical strength, who may want to raise or lower the safety, power and shade device without assistance from another person in order to enter a building or access some other relatively confined space, or accommodate changing environmental conditions. The powered deployment system (7250) can have controls mounted for easy access by the person seated in the wheelchair, such as on the armrest.

Figure 18A:
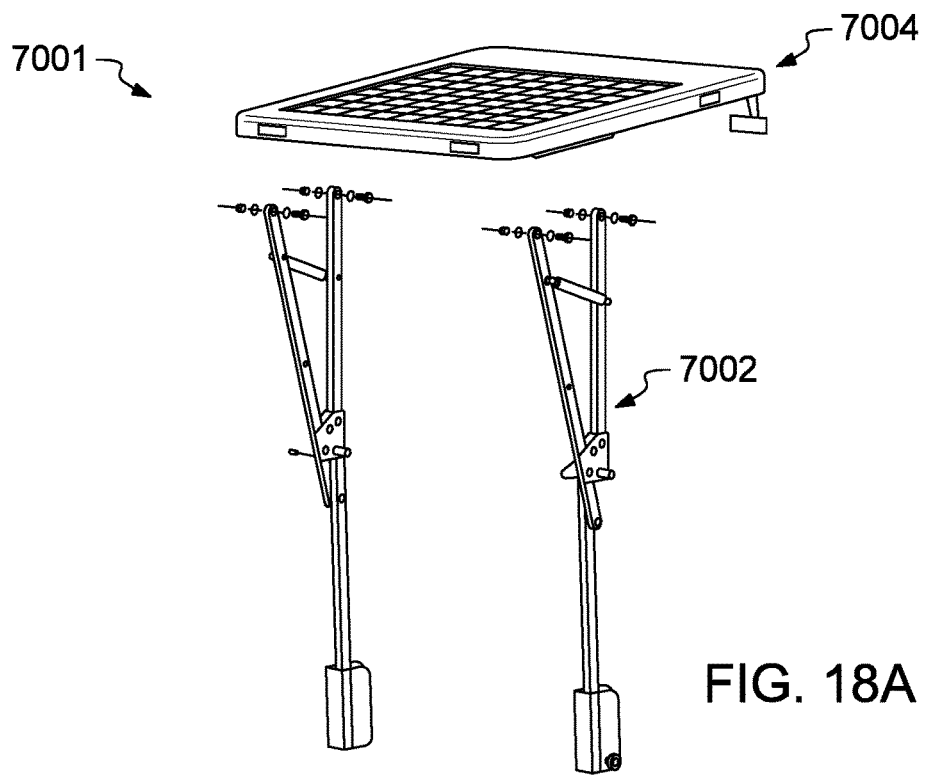
FIGS. 18A-B, 19A-C, 20A-B, and 21A-B collectively illustrate views of an example of a way to mount a safety, power and shade device to a wheelchair in accordance with some implementations of the present concepts.
Figure 18B:
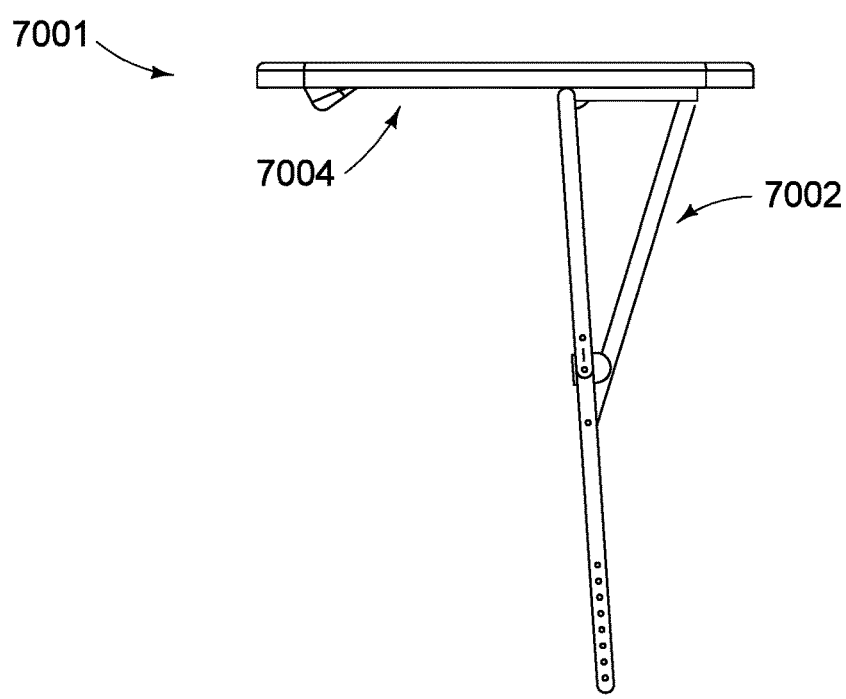

FIGS. 18A through 21B collectively illustrate portions of the safety, power and shade device (7001). In particular, example structures of frame (7002) are shown and described. FIGS. 18A through 21B generally illustrate an example of a way to attach the solar protector (7004) to a wheelchair. Other methods of attaching the solar protector to a wheelchair may be used. FIG. 18A is a perspective view and FIG. 18B is a side view of the safety, power and shade device.

Figure 19A:
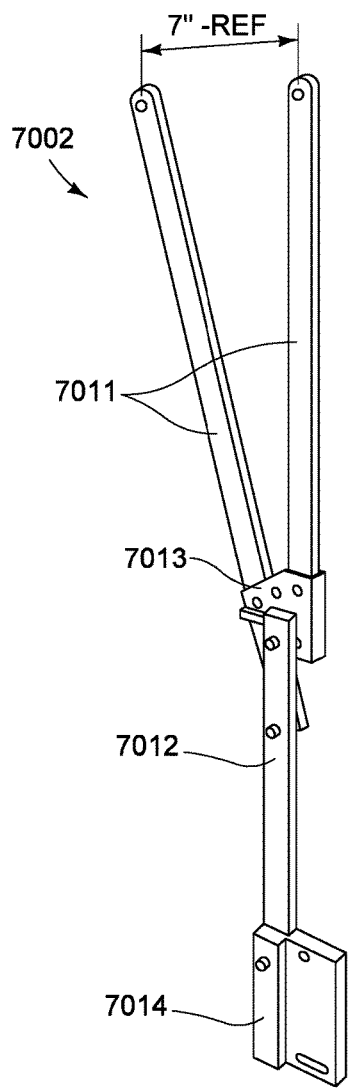
Figure 19B:
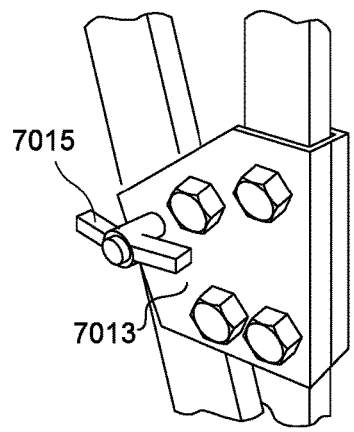
Figure 19C:
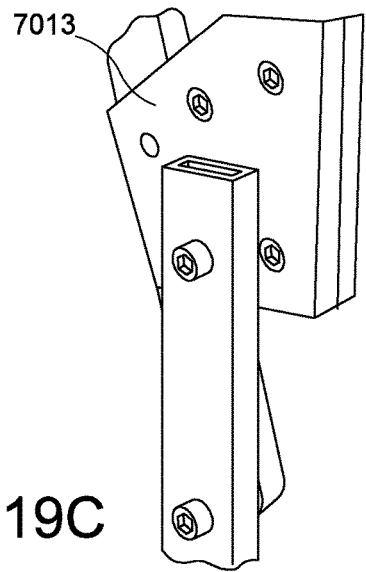

FIGS. 19A-19C and 20A-20B collectively show views of one version of the frame (7002). In this example, the frame can be constructed of hollow structural tube material in which some of the electrical wiring for the frame power system (7200) (see FIG. 17) may be contained. Examples of hollow structural tube materials can include ferrous metals, aluminum, magnesium, titanium, composites, and/or plastics, among others. Other structures besides hollow tubes are also contemplated for use in the frame. FIG. 19A illustrates the upper frame uprights (7011), lower frame upright (7012), the frame upright brace (7013), and the frame wheelchair mounting bracket (7014). FIG. 19B illustrates a close up view of the frame upright brace with a quick release pin (7015). FIG. 19C shows the opposite side of the frame upright brace from the view in FIG. 19B. The frame may be constructed in other ways that allow deployment and storage of the solar protector; other instances may not include a frame upright brace. Still other instances may include only one frame upright assembly for supporting the solar protector, instead of two as shown in FIG. 14. A single frame upright assembly could be attached at various locations, such as on one side of the wheelchair or at the rear of the wheelchair.

Figure 20A:
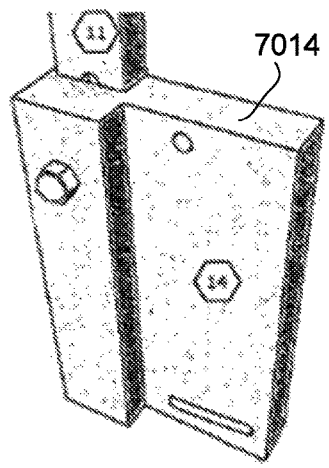
Figure 20B:
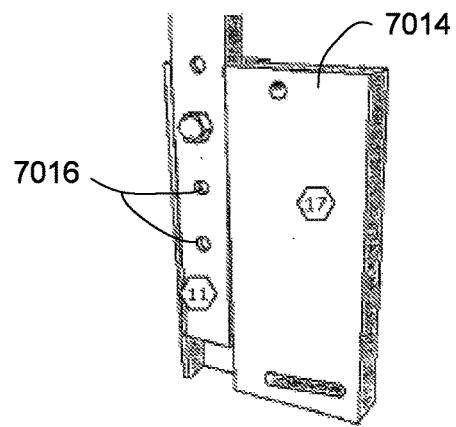

FIGS. 20A and 20B collectively show views of the wheelchair mounting bracket (7014). The frame (7002) of the safety, power and shade device (7001) can be attached to a structural element of the wheelchair (such as the wheelchair seat (7010) of FIG. 14) so that the solar protector (7004) is positioned over the seat occupant (see FIG. 14) when deployed. The height of the solar protector over the wheelchair seat can be adjustable for the comfort of the seat occupant, such as providing enough clearance above their head, while also keeping it close enough that they can reach any controls or switches which may be mounted on the solar protector. FIG. 20B illustrates an example of a height adjustment mechanism in the form of height adjustment apertures (7016) which allow adjustment of the height of the frame, and therefore to the height of the solar protector over the head of the person sitting in the wheelchair.

Figure 21A:
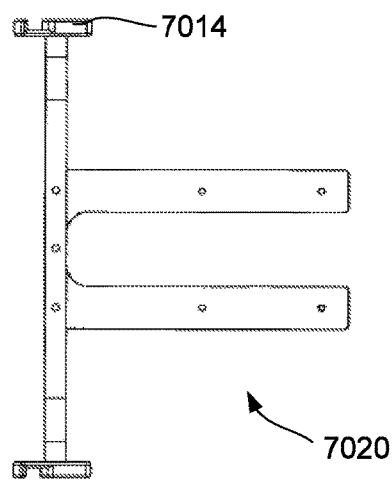
Figure 21B:
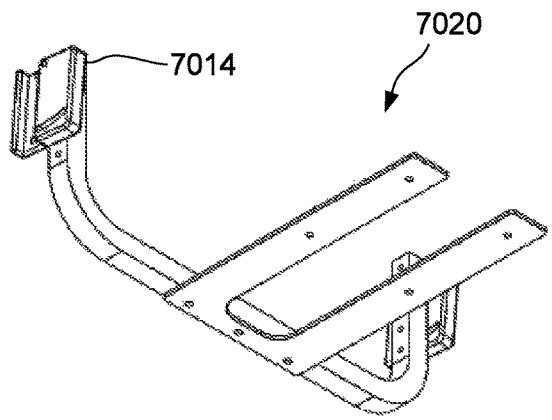

FIGS. 21A and 21B show views of the wheelchair seat attachment subassembly (7020). In other instances the frame may be attached to another part of the wheelchair and may include another type of subassembly, or may be attached directly to a part of the wheelchair without an attachment subassembly.

Figure 22A:
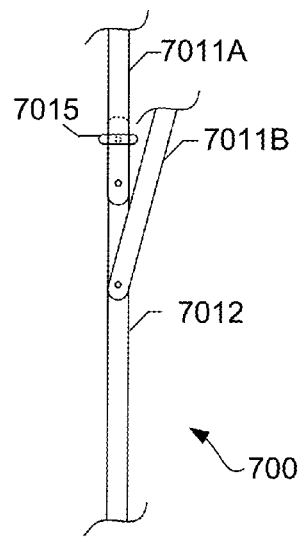
FIGS. 22A-C, 23A-C, and 24A-D collectively illustrate structures and methods of moving the safety, power and shade device from a deployed position (e.g., protective position) to a storage position.
Figure 22B:
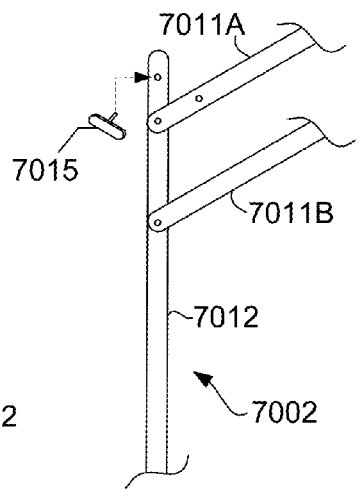
Figure 22C:
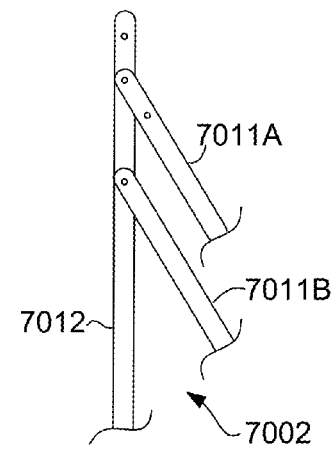

FIGS. 22A-22C and 23A-23C collectively illustrate close up drawings of two other versions of the frame (7002). These versions include the upper frame uprights (7011) (labeled here with specificity as (7011A) and (7011B)), lower frame upright (7012), and quick release pin (7015) similar to those described above relative to FIGS. 19A-19C. FIG. 22A depicts the frame in the deployed position. In this case, the pin passes through holes in upper frame upright (7011A) and lower frame upright (7012) to maintain the frame in the deployed position. In FIG. 22B the quick release pin (7015) has been removed and the frame is lowered partway. In FIG. 22C the frame is lowered to the frame storage position.

Figure 23A:
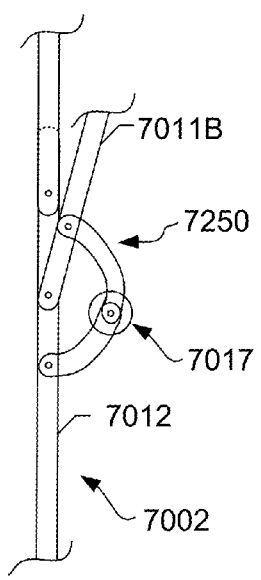
Figure 23B:
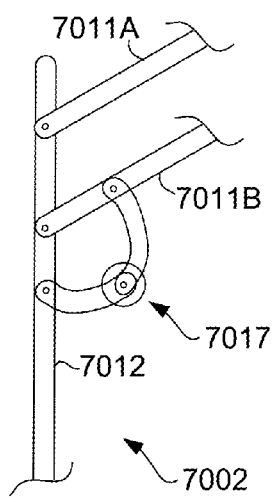
Figure 23C:
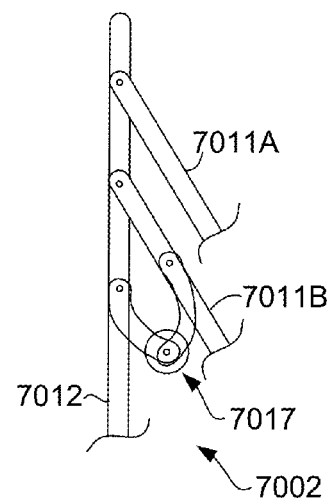

The frame version of FIGS. 23A-23C is similar to that of FIGS. 22A-22C except that a version of the powered deployment system (7250) is employed to deploy and store the frame. In this case, the powered deployment system (7250) is manifest as a drive motor or solenoid (7017) that is secured between the upper frame upright (7011B) and lower frame upright (7012). In this version, the powered deployment system (7250) eliminates the quick release pin (7015). Many other powered deployment system (7250) manifestations are contemplated beyond the illustrated configuration. These manifestations can include a multitude of different mechanical parts, solenoid valves, motors, and/or controller to accomplish moving (e.g., deploying and storing) the solar protector (7004). The powered deployment system (7250) may also be configured to adjust the position of the solar protector to accommodate different sun angles or other environmental conditions.

Figure 24A:
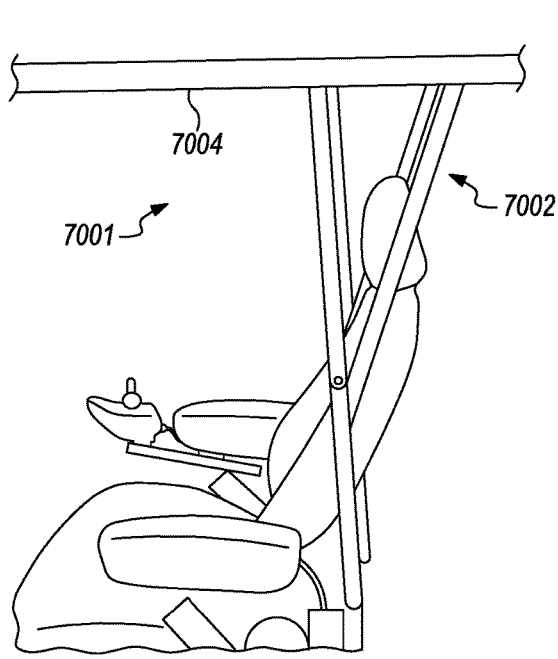
Figure 24B:
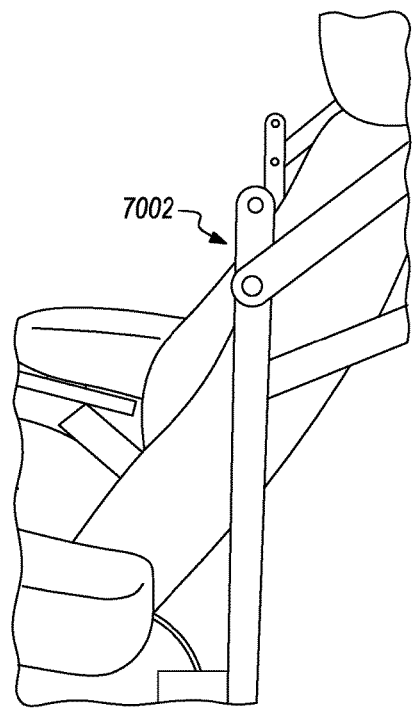
Figure 24C:
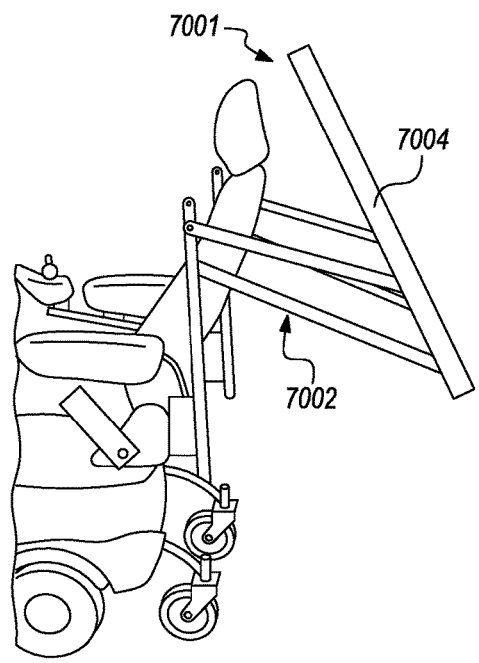
Figure 24D:
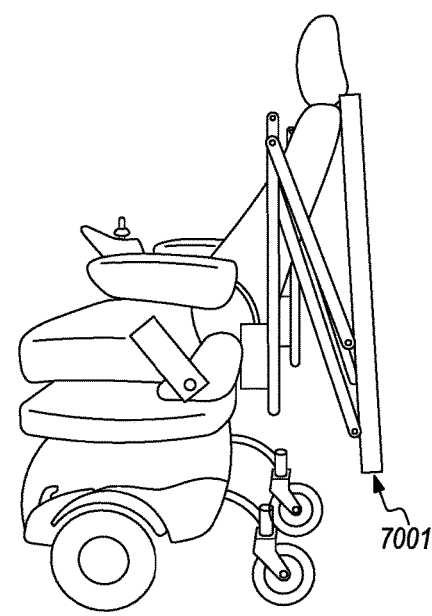

FIGS. 24A-24D collectively illustrate a method of changing the safety, power and shade device (7001) from the deployed position (FIG. 24A) to a frame storage position (FIG. 24D). In this version, the safety, power and shade device (7001) can be changed from the deployed position to the frame storage position by removing the quick release pin (7015) (see FIGS. 22A-22B) and lowering the solar protector (7004) from the deployed position, generally horizontal over the wheelchair, to the frame storage position, generally vertical and resting behind the seat back of the wheelchair. FIG. 24A shows the safety, power and shade device attached to a wheelchair seat (7010) in the deployed position. FIG. 24B illustrates a close up view of the frame (7002), where the quick release pin has been removed and the frame is moved partway from the deployed position to the frame storage position. FIG. 24C is a view showing both the solar protector and the frame manually lowered partway from the deployed position to the frame storage position. FIG. 24D shows the safety, power and shade device in the frame storage position behind the back of the wheelchair seat.

I claim:

1. A wheelchair, comprising:
    a seat configured to hold an occupant;
    a battery that can store energy;
    a drive motor that can power the wheelchair, the drive motor connected to the battery; and,
    a solar protector including at least one solar panel, the solar protector secured to the wheelchair by a frame and electrically coupled to the battery by conductors associated with the frame, the frame comprising a pair of frame uprights that are pivotally connected in vertically spaced relation to the seat and extend to the solar protector, the pair of frame uprights configured to be releasably retained in an upright orientation that maintains the solar protector in a protective position over the seat to protect the occupant while being capable of recharging the battery or pivoted downward to move the solar protector to a storage position,
    the solar protector further including a frame power system connected to the battery such that energy captured by the at least one solar panel and stored in the battery can be used to power the drive motor of the wheelchair and one or more electrical accessories.

2. The wheelchair of claim 1, further comprising a powered deployment system associated with the pair of frame uprights and configured to allow the occupant to accomplish deployment of the solar protector, including the at least one solar panel, from the storage position to the protective position.

3. The wheelchair of claim 1, wherein the battery comprises multiple batteries and/or the drive motor comprises multiple drive motors.

4. The wheelchair of claim 1, further comprising the one or more electrical accessories.

5. The wheelchair of claim 4, wherein the one or more electrical accessories comprise at least one power port.

6. The wheelchair of claim 1, further comprising three or more wheels.

7. A wheelchair, comprising:
    a seat that holds an occupant;
    a drive motor that powers the wheelchair;
    at least one solar panel and a frame that supports the at least one solar panel, the frame comprising a lower frame upright connected to the seat and a pair of upper frame uprights that are pivotally connected between the lower frame upright and the at least one solar panel;
    a battery that stores energy captured by the at least one solar panel; and,
    an electrical system that connects the drive motor, the at least one solar panel, and the battery such that the energy captured by the at least one solar panel powers the drive motor and powers a powered deployment system that operates on at least one of the pair of upper frame uprights to deploy the at least one solar panel from a storage position behind the seat to a deployed position over the seat.

* * * * *